(12) United States Patent
Brustoloni

(10) Patent No.: US 7,299,297 B2
(45) Date of Patent: Nov. 20, 2007

(54) METHOD AND APPARATUS FOR PROTECTING ELECTRONIC COMMERCE FROM DISTRIBUTED DENIAL-OF-SERVICE ATTACKS

(75) Inventor: Jose' C Brustoloni, Westfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1058 days.

(21) Appl. No.: 10/175,463

(22) Filed: Jun. 19, 2002

(65) Prior Publication Data

US 2003/0036970 A1 Feb. 20, 2003

Related U.S. Application Data

(60) Provisional application No. 60/313,031, filed on Aug. 16, 2001.

(51) Int. Cl.
*G06F 15/16* (2006.01)
*G06F 15/173* (2006.01)
*G06Q 30/00* (2006.01)
*H04L 12/56* (2006.01)

(52) U.S. Cl. .................. 709/240; 709/238; 705/26; 370/395.21

(58) Field of Classification Search ............... 709/207, 709/227, 228, 232, 235; 370/229, 320, 230.1, 370/231, 232, 351, 395.21, 395.3, 238, 223, 370/227; 705/26
See application file for complete search history.

(56) References Cited

U.S. PATENT DOCUMENTS 6,073,175 A * 6/2000 Tavs et al. .................. 709/226

(Continued)

FOREIGN PATENT DOCUMENTS

WO   WO 00/303/7   5/2000

(Continued)

OTHER PUBLICATIONS

A. Odlyzko, "Paris Metro Pricing for the Internet", Proc. ACM Conference on Electronic Commerce (EC99), ACM, 1999, pp. 140-147.

(Continued)

*Primary Examiner*—Saleh Najjar
*Assistant Examiner*—Vitali Korobov
(74) *Attorney, Agent, or Firm*—Stephen M. Gurey

(57) ABSTRACT

An Internet Service Provider (ISP), in consideration of being remunerated in some manner by an e-merchant, carries the packets of a designated subset of that e-merchant's clients, designated as VIPs, in a privileged class of service as compared to an unprivileged class of service that is used to carry the packets of the e-merchant's other regular clients. In this way, the adverse effects on performance due to congestion in the unprivileged class of service, whether due to an ongoing denial-of-service attack or not, will not affect the performance of packets sent by and to VIPs using the privileged class of service. An e-merchant may select its VIPs from among those clients that bring in a majority of the e-merchant's revenues. An e-merchant turns a regular client into a VIP by granting it a VIP right. VIP gates, preferable implemented in an ISP's access gateways, monitor the packets sent by clients and mark for the privileged class of service those packets whose source has an active VIP right issued by the packet's destination.

6 Claims, 4 Drawing Sheets

U.S. PATENT DOCUMENTS

| | | | | |
|---|---|---|---|---|
| 6,115,390 | A * | 9/2000 | Chuah | 370/443 |
| 6,167,445 | A * | 12/2000 | Gai et al. | 709/223 |
| 6,459,682 | B1 * | 10/2002 | Ellesson et al. | 370/235 |
| 6,519,636 | B2 * | 2/2003 | Engel et al. | 709/223 |
| 6,567,406 | B1 * | 5/2003 | Skemer | 370/392 |
| 6,668,046 | B1 * | 12/2003 | Albal | 379/119 |
| 6,725,378 | B1 * | 4/2004 | Schuba et al. | 726/13 |
| 6,751,668 | B1 * | 6/2004 | Lin et al. | 709/227 |
| 6,826,616 | B2 * | 11/2004 | Larson et al. | 709/228 |
| 6,839,759 | B2 * | 1/2005 | Larson et al. | 709/228 |
| 6,940,862 | B2 * | 9/2005 | Goudreau | 370/395.52 |
| 7,046,680 | B1 * | 5/2006 | McDysan et al. | 370/396 |
| 2002/0146018 | A1 * | 10/2002 | Kailamaki et al. | 370/401 |
| 2002/0194251 | A1 * | 12/2002 | Richter et al. | 709/105 |

OTHER PUBLICATIONS

R. Braden, et al., "Integrated Services in the Internet Architecture: an Overview," IETF, RFC 1633, Jun. 1994.

S. Blake, et al., "An Architecture for Differentiated Services," IETF, RFC 2475, Dec. 1998.

P. Ferguson, et al., "Network Ingress Filtering: Defeating Denial of Service Attacks Which Employ IP Source Address Spoofing", IETF, RFC 2827 (also BCP 0038), May 2000.

S. Savage, et al., "Practical Network Support for IP Traceback", Proc. SIGCOMM'2000, pp. 295-306, ACM, Stockholm, Sweden, Aug. 2000.

J. Bruno, et al., "Retrofitting Quality of Service into a Time-Sharing Operating System", Proc. Annual Tech. Conf., USENIX, Jun. 1999. pp. 15-26.

"Characterizing and Tracing Packet Floods Using Cisco Routers," Cisco, available at http://www.cisco.com/warp/public/70722.html.

Andrew Odlyzko, "Paris Metro Pricing for the Internet", *Proceedings of 1st ACM Conference on Electronic Commerce*, Denver, CO, (Nov. 3-5, 1999), pp. 140-147.

European Search Report.

* cited by examiner

METHOD AND APPARATUS FOR PROTECTING ELECTRONIC COMMERCE FROM DISTRIBUTED DENIAL-OF-SERVICE ATTACKS

CROSS-REFERENCE TO RELATED APPLICATIONS

This application claims benefit of U.S. provisional application Ser. No. 60/313,031 filed Aug. 16, 2001, which is herein incorporated by reference.

This application is also related to co-pending U.S. patent applications filed simultaneously herewith entitled: "METHOD AND APPARATUS FOR INCREMENTALLY DEPLOYING INGRESS FILTERING ON THE INTERNET", Ser. No. 10/175,577, and "METHOD AND APPARATUS FOR PROTECTING WEB SITES FROM DISTRIBUTED DENIAL-OF-SERVICE ATTACKS", Ser. No. 10/175,458.

TECHNICAL FIELD

This invention relates to communications over the Internet, and more particularly, to protecting servers on the Internet from malicious attacks that can partially or totally disrupt service.

BACKGROUND OF THE INVENTION

In a denial-of-service (DoS) attack, a malicious client (called the attacker) performs operations designed to partially or completely prevent legitimate clients from communicating with or gaining service from a server (called the victim). DoS attacks are common and cause significant losses. Well-known e-merchants, including Amazon, buy.com, E*Trade, and eBay, are among recent victims. DoS attacks can harm e-merchants in two ways. First, when an e-merchant cannot serve its customers, the e-merchant loses advertising and sales revenues. Second, the e-merchant's clients, advertisers, and investors are frustrated and may therefore seek competing alternatives.

Some DoS attacks can be prevented by proper system administration. These include physical or remote takeover attacks and death-pill attacks. In a physical takeover attack, the attacker gains physical access to components of the Internet Service Provider (ISP) or e-merchant infrastructure (e.g., one or more links, routers, or servers) and compromises their functionality. In a remote takeover attack, the attacker exploits some bug in the infrastructure's software so as to gain privileged access and thus be able to modify the software remotely. In a death-pill attack the attacker sends one or a few packets to an infrastructure component (e.g., router or server) known to contain a bug, such that the packets cause the component to crash. Proper ISP and e-merchant physical security can eliminate physical takeover attacks. Likewise, prompt installation of patches or updates that fix software bugs can prevent future remote takeover or death-pill attacks exploiting those bugs.

On the contrary, congestive DoS attacks cannot be similarly prevented. In a congestive attack, an attacker floods a server with so many packets that the server is unable to respond to requests sent by legitimate clients. Four factors make it difficult to defend against congestive attacks. First, any host connected to the Internet can be used to sustain a congestive attack against any victim also connected to the Internet. By design, the Internet will forward packets from any host to any other host on a best-effort basis, without bounding packet rate or volume. Second, there are many hosts (e.g., in homes and universities) that are connected to the Internet and do not have the benefit of proper system administration. Such hosts often contain bugs or are configured in such a way that attackers can, without authorization, use them as agents, i.e., as the hosts that actually send attack packets to a victim. Agents provide cloaking and leverage to an attacker, i.e., respectively, hide the attacker's identity and multiply the attacker's resources (e.g., bandwidth). Third, attackers can spoof attack packets, i.e., falsify the packets' source addresses. Spoofing is possible because the Internet does not validate source addresses. Spoofing further enhances an attacker's cloaking. Finally, automated tools of increasing sophistication for mounting DoS attacks can be easily downloaded from the Web. Using such tools, even unskilled Web users can mount successful attacks.

The two currently most popular DoS attack techniques, smurf and TCP SYN flooding, are both congestive. In a smurf attack, the attacker sends ICMP echo requests to a network's broadcast address. The attacker spoofs the requests with the victim's address. Therefore, each host in the network sends a reply not to the attacker but to the victim, thus unwittingly becoming an agent of the attack. In a TCP SYN flooding attack, the attacker or its agents send spoofed TCP SYN (i.e., connection request) packets to the victim. Each such bogus request causes the victim to tie up resources that could otherwise be used for requests from legitimate clients.

To prevent smurf attacks, the Internet Engineering Task Force (IETF) has changed the default treatment of directed broadcast packets by routers. Instead of accepting and forwarding directed broadcast packets, routers should now by default drop them. Additionally, to thwart spoofing, the IETF has recommended ingress filtering (see, e.g., P. Ferguson and D. Senie, "Network Ingress Filtering: Defeating Denial of Service Attacks Which Employ IP Source Address Spoofing," IETF, RFC 2827 (also BCP 0038), May 2000). With ingress filtering, ISP ingress routers should drop a packet that arrives in a port if the packet's source address does not match a prefix associated with the port. Ingress filtering automatically stops attacks that require spoofing. Moreover, if an attack that does not use spoofing occurs, ingress filtering allows the origin of the attack to be determined simply by examining the source addresses of attack packets. Therefore, ingress filtering can speed up recovery from such attacks. Disadvantageously, the IETF's recommendations need to be adopted by many parties (networks unwittingly used in smurf attacks and ISPs) that are thereby burdened with new responsibilities and costs, but receive no compensation for solving what they may consider somebody else's (the e-merchants') problem. Moreover, these recommendations do not deter all possible congestive DoS attacks. Even without spoofing and directed broadcast, attackers can use agents to obtain the cloaking and leverage necessary for successful attacks. Therefore, adoption of these recommendations (particularly ingress filtering) has not been widespread.

IP traceback is a recently proposed alternative to ingress filtering (see, e.g., S. Savage, D. Wetherall, A. Karlin and T. Anderson, "Practical Network Support for IP Traceback," Proc. SIGCOMM'2000, pp. 295-306, ACM, Stockholm, Sweden, August 2000). Unlike ingress filtering, IP traceback can be effective even if not widely deployed. IP traceback modifies routers so that they probabilistically send traceback information to a packet's destination. Statistical methods allow a victim to use such information to partly reconstruct the attack path (the reconstructed part is that closest to the victim). However, IP traceback has weaknesses that may deleteriously affect the likelihood of its adoption. It appears that attackers can easily defeat IP traceback by making attacks oblique, i.e., by ostensibly targeting neighbors of the victim, rather than the victim itself. Moreover, traceback information sent by routers that are further from the victim than is the closest attacker can be spoofed and therefore needs authentication. The infrastructure necessary for such authentication may add considerable complexity and vulnerabilities of its own. Finally, like ingress filtering, traceback does not stop attackers from using agents, and may increase ISP responsibilities and costs without contributing to ISP revenues.

Victims can often restore their Internet connectivity by simply changing their address in case of an attack. Of course, this solution is not robust against attackers that periodically check the victim's address via the current DNS mapping. A more general solution against congestive DoS attacks consists in combining input logging and rate limiting (see, e.g., "Characterizing and Tracing Packet Floods Using Cisco Routers," Cisco, available on the Cisco website, cisco.com, at/warp/public/707/22.html). To use these techniques, the victim must initially determine the signature of the attack, i.e., how the attack packets differ from legitimate packets. ISP personnel then install a filter matching the attack's signature in the egress port of the router closest to the victim. The filter generates a log that reveals what ingress port the attack is coming from. Input logging is then iterated for the next upstream router, until the router closest to the origin of the attack is found. A rate-limiting filter matching the attack's signature is then left installed in the ingress port from where the attack is coming.

Input logging and rate limiting have many limitations. First, attackers may perform an oblique attack noted above, i.e. obfuscate the attack by ostensibly targeting a neighbor of the intended victim. Thus, the victim may not have the opportunity to examine attack packets. Second, even if attack packets reach the victim, the signature may be difficult to characterize. For example, an attacker may coordinate agents so that they send endless streams of seemingly legitimate but fruitless requests to the victim, so as to crowd out requests from legitimate clients. Unlike smurf and TCP SYN flooding attacks, such crowding attacks do not cause easily identifiable anomalies at the network or transport layer, and therefore may be difficult to filter in routers. Third, filtering, logging, and rate limiting may not be available or may prohibitively slow down many routers, especially in the network core. Fourth, rate limiting may be unable to distinguish malicious and legitimate packets (e.g., TCP SYN packets) that arrive in the same ingress port. Thus, rate limiting may be ineffective if the attack is evenly distributed among ingress ports. Finally, input logging and rate limiting are often labor-intensive, tedious procedures performed under pressure and usually without adequate compensation to the ISP.

A methodology is needed, therefore, that limits the losses inflicted upon an e-merchant by congestion, whether legitimate or intentionally inflicted upon the e-merchant by an attacker.

SUMMARY OF THE INVENTION

The present invention assumes Internet support for at least two separate classes of service, a first class of service that is privileged with respect to a second (unprivileged) class of service. In the current Internet, these multiple classes of service could be implemented using, for example, what has been designated as differs (see, e.g., S. Blake, D. Black, M. Carlson, E. Davies, Z. Wang and W. Weiss, "An Architecture for Differentiated Services," IETF, RFC 2475, December 1998). In accordance with the invention, an ISP carries the packets of a designated subset of an e-merchant's clients, designated as VIPs, in the privileged class of service as compared to the unprivileged class of service that is used to carry the packets of the e-merchant's other clients, which are called regular clients. In this way, congestion in the unprivileged class of service, regardless of cause, will have limited effect on the performance of packets sent by and to VIPs using the privileged class of service. An e-merchant may select its VIPs, for example, from among those clients that bring in a majority of the e-merchant's revenues. An e-merchant turns a regular client into a VIP by granting it a VIP right. VIP gates, preferably implemented in an ISP's access gateways, monitor the packets sent by clients and mark for the privileged class of service those packets whose source has an active VIP right issued by the packet's destination. Quality of service (QoS) mechanisms protect VIP packets from overload in the regular best-effort class of service.

The quid pro quo between the e-merchant, which is able to provide a premium protected class of service to its VIP clients, and the ISP, which needs to incorporate the extra functionality into its access gateways or elsewhere, is that the e-merchant remunerates the ISP in some manner, such as through the payment of money or otherwise, for providing the value-added service. The ISP thus has the benefits of a new stream of revenue and the e-merchant has the benefits that inure to it from being able to provide such a premium-protected service to its better clients.

In addition to the VIP gate functionality that is incorporated into the ISP's access routers, the e-merchant may incorporate other functionalities itself. Thus, for example, a VIP monitor may optionally be used at an e-merchant to perform session admission control and dynamic prioritization so as to keep the performance of admitted sessions within desired performance bounds. The VIP monitor prioritizes each session according to class of service markings in client packets and load and revenues generated by recent sessions having the same client address.

A VIP protocol is used to request, install, activate and bill VIP rights.

A VIP gate in monitoring the packets transiting it from an access link, first determines whether the packet's destination was recently the source of another packet to this packet's source and in the privileged class of service. If it was, the packet is marked and forwarded in the privileged class of service. Thus, reply packets to a client coming from a server are handled in the same class of service that the request packets were sent to the server from the client. If it was not, then the source of the packet may not be a server, but a client, and a determination is made whether the destination of the packet is a subscribing site. If the destination isn't a subscribing site, the packet is marked for the unprivileged class of service. If the packet source is a subscribing site, a determination is made whether the source of the packet is a VIP of the destination. If the source is a VIP, the packet may be marked and forwarded using the privileged class of service. A client may choose, however, not to use what may be its usage-limited VIP rights, in which case the client is an inactive VIP and its packets are marked and forwarded using the unprivileged class of service. If the client is active, thus choosing to use its usage-limited VIP rights, a determination is made whether the packet's usage of those rights would exceed that client's VIP usage limits. If the usage limits would be exceeded, it is marked and forwarded using the unprivileged class of service. If the usage limits would not be exceeded, the packet is marked and forwarded using the privileged class of service and that client's usage of its VIP rights is updated.

DETAILED DESCRIPTION

Figure 1:
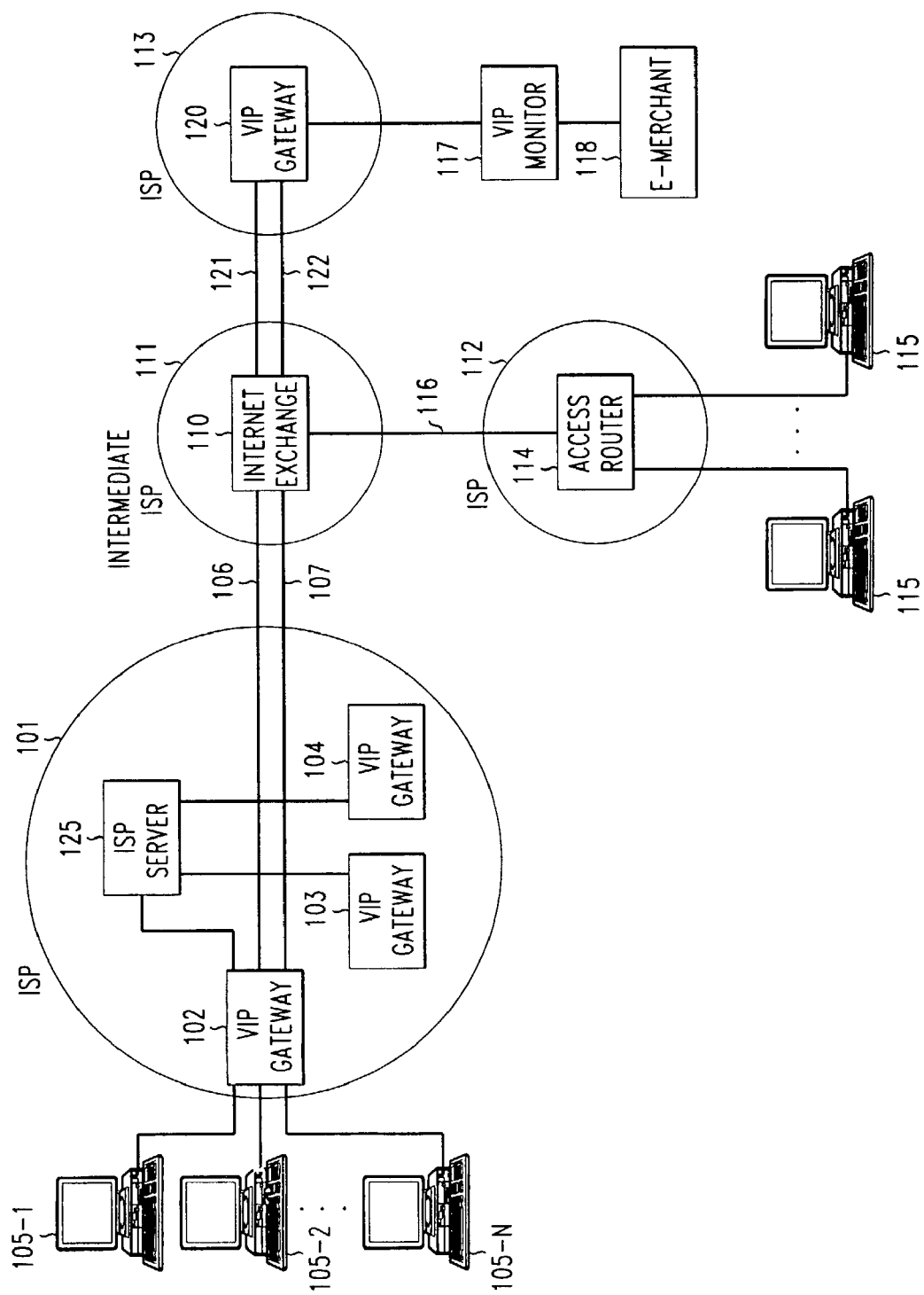
FIG. 1 is a block diagram of a system in which VIP gates are incorporated in the access gateway routers that interface the input ports in the ISP that services an e-merchant and in the ISP that services the e-merchant's VIP customers.

With reference to FIG. 1, ISP 101, which supports the VIP service and thus two classes of service, incorporates a VIP gate into its access gateways (referred to hereinafter as VIP gateways) 102, 103 and 104, for three exemplary points of presence (PoPs) of the ISP. A plurality of clients 105-1-105-N are shown connected over access links to VIP gateway 102. Other clients are similarly connected to VIP gateways 103 and 104, but are not explicitly shown in FIG. 1. The access links connecting the clients and the VIP gateways can be over any telecommunications network such as a local POTS network or a DSL connection, a cable network using a cable modem, or any other network or methodology, wired or wireless, which provides Internet connectivity to the clients. Two classes of service, privileged and unprivileged, are available to packets sent from and sent to ISP 101. To illustrate that separate resources are available to these separate classes of service, ISP 101 and Internet exchange 110 within an intermediate ISP 111 are shown interconnected by two connections 106 and 107, for the separate transmission of packets in the privileged and unprivileged classes of service, respectively.

At Internet exchange router 110, two or more ISPs exchange packets. Two other ISPs are shown connected to Internet exchange 110: ISP 112 and ISP 113. ISP 112 does not support the VIP service and is shown including an exemplary access router 114 to which a plurality of clients 115 are connected over access links. Since only one class of service is supported, a single transmission facility 116 interconnects access router 114 and Internet exchange router 110. ISP 113 supports the VIP service and is the ISP that provides Internet connectivity to the e-merchant that offers the VIP service to its best clients. A VIP monitor 117, to be described herein later, interconnects the front end of the e-merchant's server 118 and the VIP gateway 120 within ISP 113. Packets are transmitted in both directions between VIP gateway 120 and Internet exchange 110 in the privileged class of service and in the unprivileged class of service over separate facilities 121 and 122, respectively.

In accordance with the VIP service, the e-merchant 118 requests that an ISP, such as ISP 101, carry packets of a designated subset of the e-merchant's clients in the privileged class of service as compared to the unprivileged class of service that is used to carry the packets of the e-merchant's other clients. The term privileged class of service as used herein and in the accompanying claims encompasses any method that limits the adverse effects of packets sent in the unprivileged class of service on the performance of the packets being sent in the privileged class of service. Members of the designated privileged subset are called VIPs, whereas other clients are called regular clients. The e-merchant 118 may select its VIPs in any manner such as from among those clients that bring in a majority of the e-merchant's revenues. The e-merchant 118 turns a regular client into a VIP by granting it a VIP right. VIP gates incorporated in the access routers, designated VIP gateways 102, 103 and 104, monitor packets and mark for the privileged class of service those packets whose source has an active VIP right issued by the packet's destination (or vice-versa). Thus, similarly, VIP gateway 120 in ISP 113 monitors those packets from e-merchant 118 and marks for the privileged class of service packets that have a destination address of a VIP. Quality of service (QoS) mechanisms protect VIP packets in either direction from overload in the regular best-effort class of service.

A regular client 105 becomes a selected client when the e-merchant 118 grants a VIP right to the client. A selected client becomes a VIP when the selected client activates the respective VIP right. A VIP becomes a selected client when the VIP deactivates the respective VIP right. A VIP or selected client becomes a regular client when the respective VIP right expires or is revoked by the e-merchant.

The judgment of what clients should have VIP privileges for sending packets to a given e-merchant 118 is made only by that e-merchant, and not by a client. Therefore, a VIP right is always client-specific, i.e., a client cannot transfer to another client a VIP right. Because the e-merchant 118 may not consider another e-merchant's VIPs particularly worthy, a VIP right is always specific to the e-merchant that granted the VIP right. Thus, the privileged class of service is only used to carry a client's packets to the e-merchant that granted that client the VIP right.

The e-merchant 118 grants or revokes a VIP right to one or more clients 105 by sending to ISP 101 a request that the ISP respectively insert the VIP right into or remove the VIP right from the ISP's VIP list. The VIP list may be stored in association with the VIP gateway 102, which is the point of presence (PoP) to ISP 101 of client 105. Thus, a VIP right is always ISP-specific. The e-merchant 118 may also grant VIP rights for the same client at different ISPs or at different PoPs of the same ISP. Typically, an e-merchant will grant a client no more than a few VIP rights, e.g., one that the client may use at home, another for use at work, and perhaps a third for use while traveling.

Every VIP right is term-limited, expiring at a certain time. This term limit reflects the frequency with which the e-merchant ranks clients for selection of VIPs. Every VIP right is also usage-limited and thus expires when the amount of information (e.g., number of packets or bytes) the client has sent using it reaches a specified limit. This usage limit is calculated to allow a VIP to perform, as a VIP, sufficient new transactions to remain a VIP.

A VIP right may also be location-specific, being usable only in a certain PoP of an ISP. Location-specific VIP rights may be used, for example, for access from home or from work. A location-specific VIP right allows the respective activation, deactivation, and usage accounting to be processed entirely locally at the PoP, e.g., at VIP gateway 102 for a client 105. This local processing provides straightforward scalability and robustness with respect to DoS attacks against most of the ISP's infrastructure. Alternatively, a VIP right may be location-independent, thus usable in any of the ISP's PoPs. A location-independent VIP right may be used, for example, for mobile access. To activate, deactivate, read, or update the usage accounting of a location-independent VIP right, a VIP gateway, such as VIP gateway 102, needs to communicate with a remote database server, such as ISP server 125 within ISP 101. Because these operations cannot be performed locally, they are more susceptible to DoS attacks than is the case for location-specific VIP rights. Thus, location-independent VIP rights require more sophisticated distributed database processing techniques for high scalability and robustness.

Each VIP gateway, such as VIP gateway 102, maintains a VIP list and a Web site where clients can activate and deactivate the respective VIP rights. The VIP list associated with VIP gateway 102 contains that VIP gateway's location-specific VIP rights and replicas of location-independent VIP rights activated by the clients 105 connected to the VIP gateway. The VIP gateway 102 dynamically binds a client 105 with an address when the client activates a VIP right. Thus, client addresses need not be fixed. When a client 105 activates a location-independent VIP right, VIP gateway 102 locks and reads the respective records from the remote database 125. Conversely, when the client deactivates the right, the VIP gateway 102 updates and unlocks the respective records in the remote database 125.

VIP gateway 102 monitors the packets coming in from the access links connected to clients 105, marks for transmission in the privileged class of service those packets whose source is a VIP with respect to the packet's destination, marks for the unprivileged regular class of service all other packets, and maintains VIP rights' usage information.

VIP gateway 120 is the PoP of e-merchant 118, which issues the VIP rights to the clients 105 that conduct transactions with that e-merchant through ISP 101. Since the responsive packets to packets that were received by e-merchant in the privileged class from a VIP client should be returned to that same client in the privileged class, VIP gateway 120, and each other VIP gateway determines whether the packet's destination (e.g., a client 105) has an active VIP right issued by the packet's source (in this case, e-merchant 118). To determine whether a packet's destination has an active VIP right issued by the packet's source, a VIP gateway 120, and each other VIP gateway, caches whether packets recently sent from the destination to the source were marked for a privileged class of service.

As described above and as shown in FIG. 1, VIP gates are preferably implemented in the input ports of an ISP's access gateways, the VIP gateways. This allows the ISP to separate the privileged VIP traffic and the unprivileged and regular traffic as close to its source as possible. VIP gates can also be implemented downstream from access gateways as, for example, stand-alone devices or integrated with differs edge routers. Disadvantageously, however, a downstream implementation may leave packets from VIP clients vulnerable to congestion caused by regular packets between an access gateway and the corresponding downstream VIP gate.

IP address spoofing may in some cases allow a regular client to pose as a VIP client. Therefore, mutually authenticated tunnels, using IPsec for example, between a client and a VIP gate may be desirable in the following circumstances: (a) the client is in an ISP customer's network that has many IP addresses (e.g. at a company or university); (b) access to the ISP is via a shared medium with layer-2 authentication that is either nonexistent or deemed insecure (e.g., WEP in 802.11b wireless networks); or (c) the VIP gate is implemented downstream from an access gateway that does not implement ingress filtering, the latter having been described above.

A VIP monitor 117, noted above, is an optional device connected to the front-end of the e-merchant's site 118. It is a device that performs session admission control and prioritization at the e-merchant site, so as to keep the performance of admitted sessions within desired performance bounds. The VIP monitor 117 prioritizes each session according to the class of service markings in client packets and load and revenues generated by recent sessions having the same client address. In performing this prioritization, VIP monitor 117 favors VIP, up-and-coming, and regular sessions (in that order), in detriment of disappointing sessions. Disappointing sessions are those that have the same client address and class of service as one or more recent sessions that have consumed excessive e-merchant resources without generating revenues. Conversely, up-and-coming sessions are regular unprivileged class of service sessions that have the same client address and class of service as one or more recent sessions that have generated significant revenues without unduly consuming e-merchant resources. VIP sessions are those that have the VIP privileged class of service marking and are not disappointing. If, however, an excessive number of VIP clients access the e-merchant's site 118 at the same time, the VIP monitor 117 may downgrade one or more VIP sessions to a lower priority, according to the recent load and revenues generated by each client. Regular sessions are all other sessions.

The VIP monitor 117 is typically implemented at a customer-premises front-end, as shown in FIG. 1, or alternatively, in a Web switch. The VIP monitor advantageously enables the ability to respond to client load and revenues more quickly and in a more nuanced fashion than is possible using only VIP gates.

The afore-described VIP service assumes that ISPs can support at least two classes of service, the privileged VIP class of service and the regular unprivileged class of service. As previously noted, different classes of service may be implemented using the previously noted and referenced differs. Other implementations could use integrated services (intserv) (see, e.g., R. Braden, D. Clark, S. Shenker, "Integrated Services in the Internet Architecture: an Overview," IETF, RFC 1633, June 1994), or any other quality of service scheme. Most currently available routers support at least one such scheme. The regular unprivileged class of service may be, for example, the network's best-effort class of service. The VIP privileged class of service may be one having higher priority than that of the regular unprivileged class of service, or having a certain minimum share of each required resource, such as bandwidth and buffer space. The class of service may be marked, for example, in the TOS (type of service) field of the packet's IP header.

More than one ISP may be involved in carrying packets from a client to an e-merchant. In such cases, each ISP must be able to differentiate privileged VIP and unprivileged regular traffic, but it is not necessary that all ISPs use the same mechanisms to achieve such differentiation.

At Internet exchange 110, where ISPs 101, 112 and 113 exchange packets, class of service markings used in packets coming from one ISP need to be mapped into class of service marking used by the ISP to which those packets are directed. Since ISP 112 does not support VIP service, as noted above, only the regular unprivileged class of service is available for the transport of packets directed to e-merchant 118 from any client 115 connected to that ISP. Internet exchange 110 thus transports packets directed to and from a client 115 and e-merchant 118 in the unprivileged regular class of service.

Similarly, at peering points at which two peer ISPs directly exchange packets, a first ISP that supports VIP service needs to map class of service markings in packets received from a second ISP. If the second ISP also supports VIP service, then the first ISP needs to map the second IPS's privileged VIP and regular unprivileged class of service markings respectively into the first ISP's equivalent class of service markings. On the other hand, if the second ISP does not support the VIP service, then the first ISP needs to map any of the second ISP's class of service markings into the first ISP's regular unprivileged class of service marking.

The mappings performed at an Internet exchange and at a peering point may require changing the TOS and correspondingly updating the checksum of the IP header of each packet. Since IPsec, TCP, and UDP checksums do not depend on the TOS, these checksums do not need to be updated.

E-merchants also need to separate the resources used by each class (a session class if using the optional VIP monitor, or client class of service otherwise). In large sites, this can be achieved by using separate hosts as servers for each class. A Web switch will then forward the traffic of each class to the respective servers. Each server may run a conventional operating system.

Alternatively, in small sites, a single host running an operating system with quality of service support may be used as server for all classes. An example of an operating systems that may be used for such purpose is Eclipse/BSD (see, e.g., J. Bruno, J. Brustoloni, E. Gabber, B. Ozden, and A. Silberschatz, "Retrofitting Quality of Service into a Time-Sharing Operating System", *Proc. Annual Tech. Conf.*, USENIX, June 1999, pp. 15-26).

Congestion or disruption in an ISP customer's network (e.g., at a company or university) or shared-medium access link (e.g., cable or wireless) can affect VIP clients that access an ISP via such a network or access link. These vulnerabilities can be eliminated by using (1) customer-premises networks that support and enforce different classes of service, and (2) exclusive access links, such as DSL, dial-up, ISDN, or leased lines.

The methodology of the VIP protocol, which is used to request, install, activate and bill VIP rights is described in connection with the flowchart in FIG. 2. During a first stage of the VIP protocol, a client registers with a desired ISP. This stage is performed only once per desired ISP and location. At step 201, the client chooses an ISP, a client identification (ID), a password, and a location for using the VIP rights. The location may represent one of the IPS's PoPs (for a location-specific right)) or be left unspecified (for a location-independent right). The client may make these choices, for example, using an ISP's secure Web site, which should check that the client id and password are not easily guessable. At step 202, the client obtains from the ISP an ISP client locator, which is a data structure containing the ISP name (in cleartext) and client id and location (both encrypted by the ISP using a secret key known only to the ISP, so as not to disclose them to the e-merchant or other parties). The client may download this data structure from the ISP's site as a file. The client also receives from the ISP the URL of a password-protected VIP gateway Web page where the client can activate and deactivate its VIP rights. This may be implemented by Web redirection. At step 203, the client bookmarks or memorializes this URL in some other medium.

The second stage in the VIP protocol comprises only step 204. The client provides the ISP client locator to an e-merchant that the client wishes to access as a VIP. This may be implemented by uploading the ISP client locator to a secure Web site maintained by the e-merchant. The e-merchant may preserve past client information, so that the client may need to perform this stage only once per location and e-merchant that the client desires to access as a VIP.

The third stage comprises steps 205-207, and is performed by the e-merchant each time the e-merchant grants new VIP rights. At step 205, the e-merchant prepares a VIP right, which is a data structure containing the ISP client locator, the e-merchant's client id (encrypted by the e-merchant using a secret key known only to the e-merchant, so as not to disclose it to the ISP), the e-merchant name or address(es), the expiration time, and the usage limits (the latter three items in cleartext). At step 206, the e-merchant requests the ISP to include the VIP right in the ISP's VIP list. This may be implemented employing a mutually authenticated and encrypted channel between the e-merchant and the ISP, e.g. using the Transport Layer Security (TLS) protocol. At step 207, the ISP decrypts the locator embedded in the VIP right and includes the VIP right in its corresponding VIP list. If the VIP right's location is specified, then the ISP updates the respective VIP gateway's VIP list, otherwise the ISP updates the ISP's location-independent VIP list. The former update may be implemented employing a mutually authenticated and encrypted channel between the ISP and each of the VIP gateways using, for example, TLS.

The fourth stage of the protocol comprises step 208 only. At step 208, when desired, the client goes to a VIP gateway's password-protected Web page to activate or deactivate the respective VIP rights.

The fifth and final stage comprises steps 209. At step 209, the ISP periodically verifies the usage of each VIP right and bills the e-merchant. The bill may include, for example, a minimum monthly fee per VIP right that the e-merchant requests the ISP to install, plus an amount proportional to the actual network usage of the e-merchant's VIPs.

Figure 2:
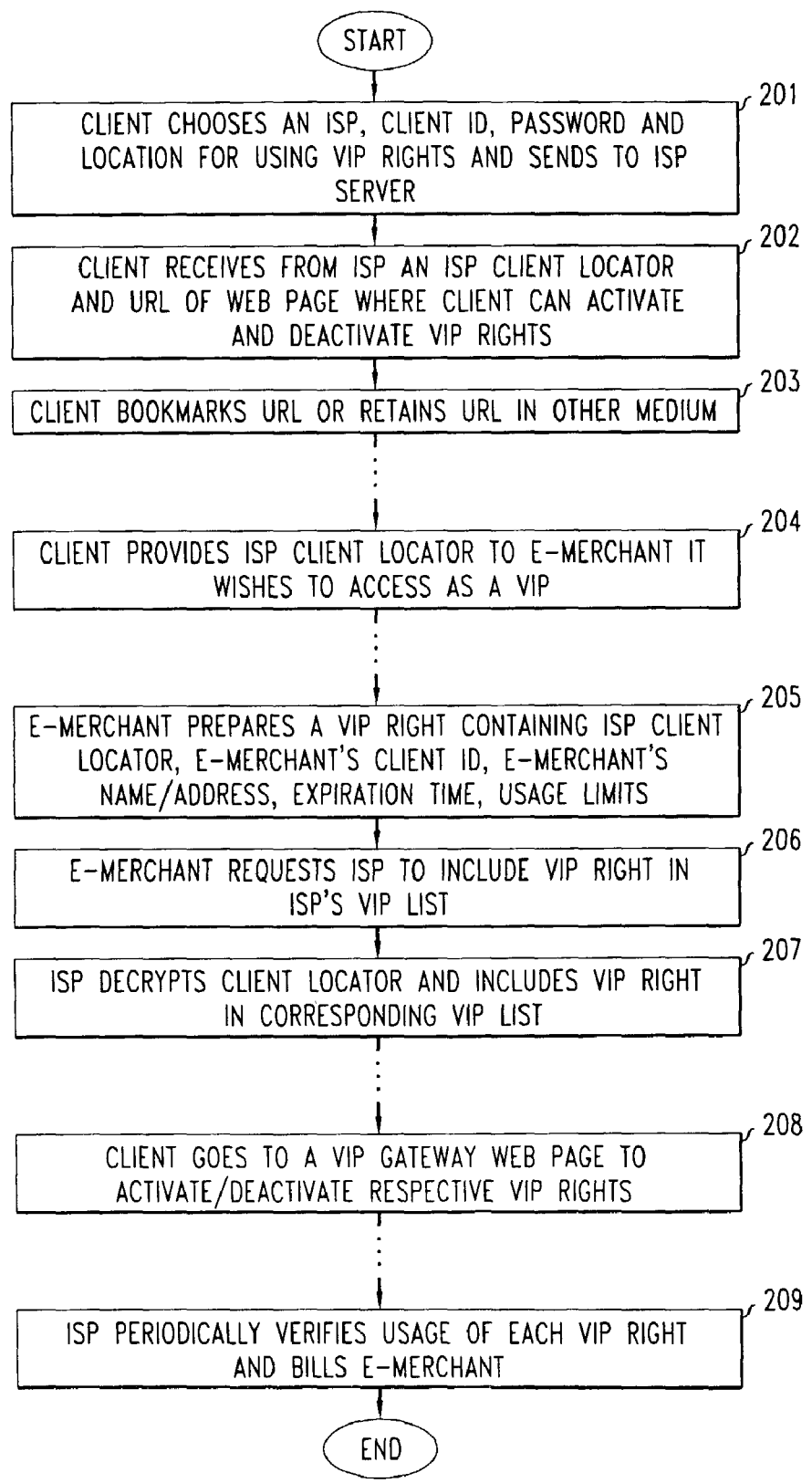
FIG. 2 is a flowchart showing the VIP protocol for requesting, installing, activating, and billing VIP rights.

The protocol shown in FIG. 2 can be easily strengthened, for example, by having the ISP give the client a hardware token, such as a SecurID, in step 202, and requiring the client to combine the hardware token with the client's password in step 208. Certificate-based strengthening is also possible.

Figure 3:
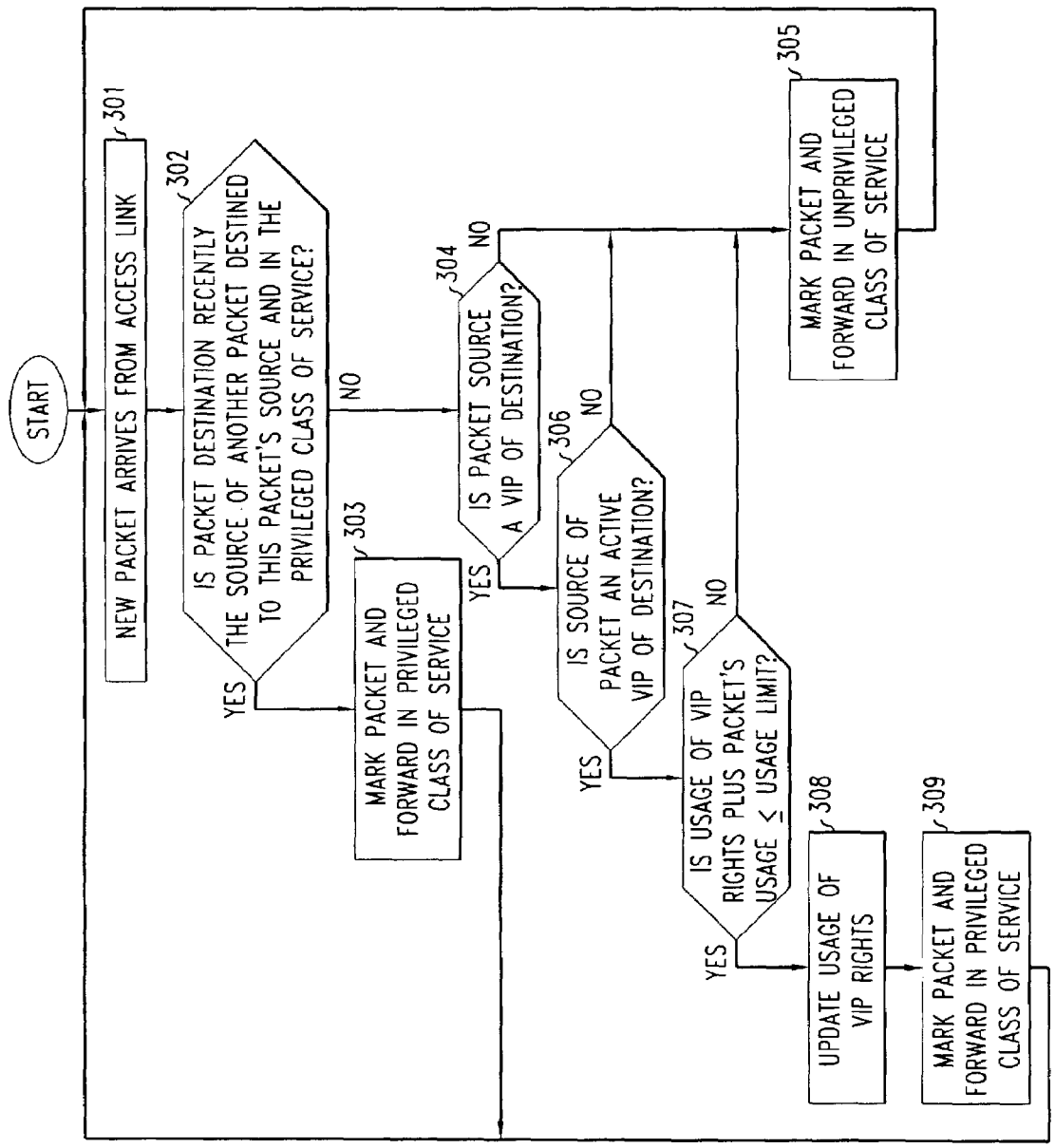
FIG. 3 is a flowchart showing the steps performed at an access gateway.

The flowchart in FIG. 3 shows the processing of a packet by a VIP gateway. At step, 301, the packet arrives from an access link at the input port of a VIP gateway. At step 302, a determination is made whether the packet's destination was recently the source of another packet destined to this packet's source and in the privileged class of service. If yes, then, at step 303, the packet is marked and forwarded in the privileged class of service. If not, then, at step 304, a determination is made whether the packet's source is a VIP of its destination. If not, then, at step 305, the packet is marked and forwarded in the unprivileged class of service. If yes, then, at step 306, a determination is made whether the source of the packet is an active VIP of the destination. If not, then, again at step 305, the packet is marked and forwarded in the unprivileged class of service. If yes, then, at step 307, a determination is made whether the previous usage of the VIP rights plus this packet's usage would be less than or equal to the VIP's usage limits that have been given to it by the e-merchant. If these usage limits would be exceeded, then, again at step 305, the packet is marked and forwarded in the unprivileged class of service. If these usage limits would not be exceeded, then, at step 308, the VIP's usage of its VIP rights is updated, and, at step 309, the packet is marked and forwarded in the privileged class of service.

Figure 4:
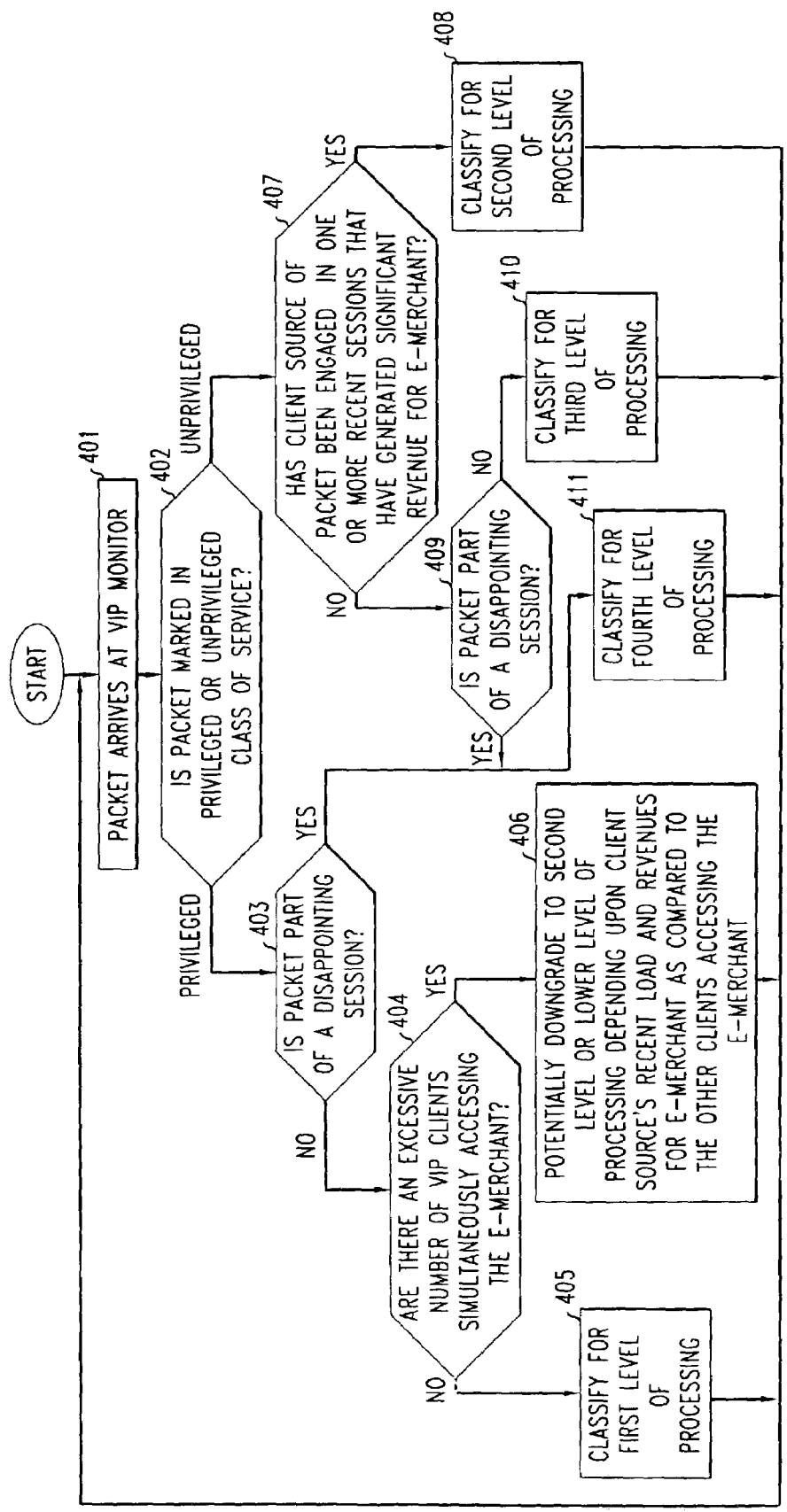
FIG. 4 is a flowchart showing the steps performed by a VIP monitor.

The flowchart in FIG. 4 shows the steps associated with classifying sessions between a client and an e-merchant by the optional VIP monitor 117, previously described. At step 401, packets within a session arrive at the e-merchant. At step 402, the class of service of the arriving packets is verified. If privileged, at step 403, a determination is made whether the session is-one that is disappointing. As previously noted, a disappointing session is one that has the same client address and class of service as one or more recent sessions that has consumed excessive e-merchant resources without generating revenues for the e-merchant. If not a disappointing session, then, at step 404, a determination is made whether there are an excessive number of VIP clients simultaneously trying to access the e-merchant. If not, then, at step 405, the session is classified in the first level for processing by the e-merchant at the highest priority level. If there are an excessive number of VIP clients simultaneously accessing the e-merchant, then, at step 406, the session may be downgraded to a lower priority level of processing depending upon recent load and revenues generated by the client as compared with the recent load and revenues generated by the other VIP clients which are simultaneously trying to access the e-merchant. If, at step 402, the class of service is determined to be unprivileged, then, at step 407, a determination is made whether the client has been engaged in one or more recent sessions that have generated significant revenues without unduly consuming the e-merchant's resources. If yes, then, at step 408, the session is deemed up-and-coming, and is processed by the e-merchant at a second level, at a lower priority than the first level. If, at step 407, the determination is made that the client has not been engaged in one or more recent revenue producing session, then, at step 409, a determination is made whether the session is disappointing. If not a disappointing session, then at step 410, the session is processed by the e-merchant at a third level, which is lower than the second level. If a session, privileged or unprivileged, is determined to be disappointing, at step 403 or at step 409, respectively, then, at step 411, the session may be processed by the e-merchant at a fourth and lowest level.

Advantageously, the implementation of VIP service makes it very difficult for an attacker to mount a successful DoS attack against an emerchant's VIP clients. Currently, an attacker can easily scan for vulnerable computers to use as agents for a DoS attack: Any computer will do. VIPnet changes that. Attacks launched from regular clients do not block the VIP clients because VIP packets are carried in a separate class of service. Consequently, attacks launched against the e-merchant that would affect the VIP clients need to be launched from among the VIP clients. Because VIP rights cannot be forged, the attacker can use only computers that have active VIP rights for the intended victim. Therefore, the universe of potential agents is smaller and more difficult to scan for. Moreover, the traffic that any one VIP agent might generate is limited, because VIP rights are term and usage limited. Consequently, the attacker cannot sustain an attack. A corollary of the above advantage is that VIP service protects what may be a major part of an e-merchant's revenues from the effects of congestion and DoS attacks. The other main advantage of VIP service is that it allows e-merchants to provide to select clients a superior quality of service.

As previously noted, the present invention is likely to be implemented, in part, as a computer program or application running in the periphery of the Internet, most probably in an access gateway. As noted, however, It may also be implemented, in part, in a computer program or application running at downstream from an access gateway.

It should be noted that the term privileged class of service as used herein and in the claims encompasses any method that limits the adverse effects of packets sent in the unprivileged class of service on the performance of the packets being sent in the privileged class of service.

The foregoing merely illustrates the principles of the invention. It will thus be appreciated that those skilled in the art will be able to devise various arrangements, which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be further appreciated by those skilled in the art that the block diagrams herein represent conceptual views embodying the principles of the invention. Similarly, it will be appreciated that the flowchart represents various processes that may be substantially represented in computer readable medium and so executed by a computer or processor, whether or not such computer or processor is explicitly shown.

The invention claimed is:

1. A method of limiting the effect upon certain users that access an e-merchant's server from a denial-of-service attack against the e-merchant's server, the method comprising:

marking a packet addressed to the e-merchant's server for forwarding in a privileged class of service when the source of the packet is a computer whose user is a VIP user who has been designated by the e-merchant as being within a predetermined subset of users who transact business online with the e-merchant through the e-merchant's server, where a determination that the computer's user is a VIP user is made through the VIP user's activation of a VIP right that was granted to the VIP user by the e-merchant and the attachment of that VIP right to the VIP user's computer, the VIP right granted by the e-merchant to the VIP user automatically expiring at the end of a specified term and/or after a specified maximum number of packets or bytes have been forwarded to the e-merchant's server by the VIP user's computer client-in the privileged class of service.

2. The method of claim 1 further comprising:

marking a packet addressed to the e-merchant's server for forwarding in an unprivileged class of service when the source of the packet is a computer whose user has not been designated as a VIP user by the e-merchant, is a VIP user whose VIP right has either expired or has previously forwarded the specified maximum number of packets or bytes to the e-merchant's server in the privileged class of service, or is a VIP user who has not activated and attached his VIP right to his computer.

3. The method of claim 1 wherein the VIP user can dynamically activate or deactivate a VIP right granted to it by the e-merchant such that packets originating from the VIP user's computer and addressed to the e-merchant's server are marked for forwarding in the privileged class of service only when the respective VIP right is unexpired and has been activated, and are marked for forwarding in the unprivileged class of service otherwise.

4. Apparatus for limiting the effect upon certain users that access an e-merchant's server from a denial-of-service attack against the e-merchant's server comprising:

means for storing a VIP right for at least one user who has been designated by the e-merchant as a VIP user who is within a predetermined subset of users that transact business online with the e-merchant through the e-merchant's server, the VIP right being granted individually by the e-merchant to the at least one VIP user and having a specified term and/or specified packet or byte usage limits; and a computer program or application that performs a method of marking a packet addressed to the e-merchant's server for forwarding in a privileged class of service when the source of the packet is a computer whose user has been designated as a VIP user by the e-merchant, where a determination that the computer's user is a VIP user is made through the VIP user's activation of the VIP right and the attachment of that VIP right to the VIP user's computer, and the specified term of the VIP right granted to that user that is stored in the storing means has neither expired nor have the number of packets or bytes that have been already forwarded from that client to the e-merchant's server in the privileged class of service exceeded the specified packet or byte usage limits of that user's VIP right.

5. The apparatus of claim 4 wherein the computer program or application further marks a packet addressed to the e-merchant's server for forwarding in an unprivileged class when the source of the packet is a computer whose user has not been designated as a VIP user by the e-merchant, is a VIP user whose VIP right has either expired or has previously forwarded the specified maximum number of packets or bytes to the e-merchant in the privileged class of service, or is a VIP user who has not activated and attached his VIP right to his computer.

6. The apparatus of claim 5 wherein the computer program marks a packet addressed to the e-merchant's server for forwarding in the privileged class of service only when the source of the packet is a computer whose user is an active VIP user of the e-merchant, and marks a packet for forwarding a packet addressed to the e-merchant's server in the unprivileged class of service if the source of the packet is a computer whose user is an inactive VIP user of the e-merchant.

\* \* \* \* \*